Nov. 7, 1933.  W. LUDENIA  1,934,078
SHORT WAVE BEAM TRANSMITTER
Filed May 12, 1931
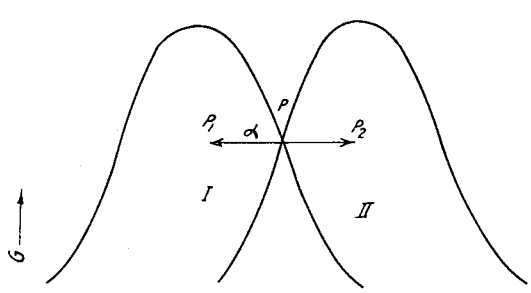
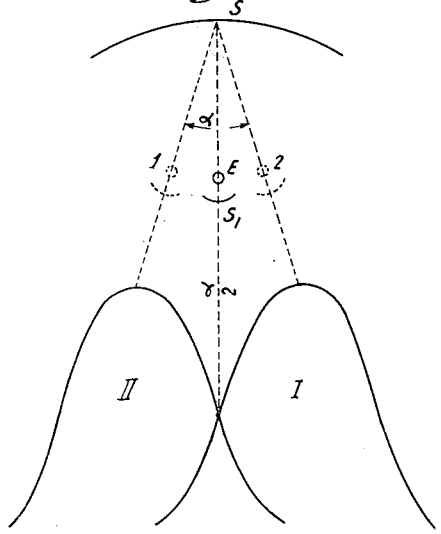
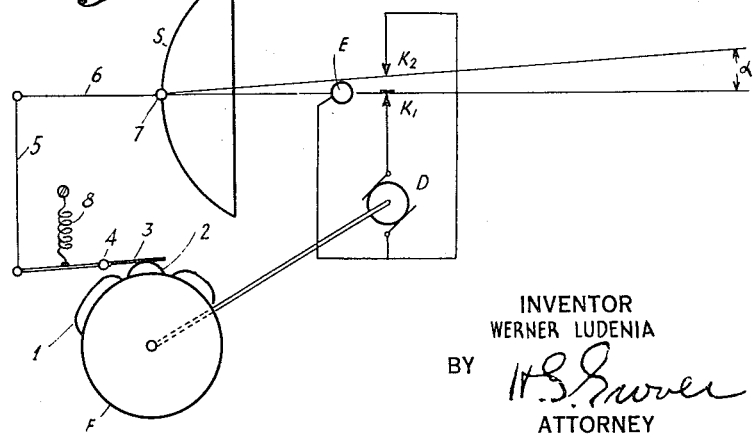
INVENTOR
WERNER LUDENIA
BY
ATTORNEY Patented Nov. 7, 1933

1,934,078

UNITED STATES PATENT OFFICE 1,934,078

SHORT WAVE BEAM TRANSMITTER

Werner Ludenia, Berlin, Germany, assignor to Telefunken Gesellschaft fur Drahtlose Telegraphie m. b. H., Berlin, Germany, a corporation of Germany Application May 12, 1931, Serial No. 536,713, and in Germany January 15, 1930

4 Claims. (Cl. 250—11)

The present invention relates to beam transmitters and involves a new and improved method of and means for producing and radiating beams of energy which are characteristic of the path over which they travel.

The novel features of my invention have been pointed out with particularity in the claims appended hereto.

The nature of the invention, the method of operation thereof, and the arrangements by which the invention may be carried out, have been described in detail in the specification and illustrated in the annexed drawing, in which:

Figure 1 is a curve illustrating the radiation which it is desired to obtain; while, Figures 2, 3, 4, and 5 illustrate diagrammatically arrangements whereby the present invention is carried out.

To obtain a sharply bounded directional beam it is advantageous to have recourse to a differential arrangement of the type disclosed by Kiebitz. The same consists in that two not particularly sharp beams or cones of radiations are radiated off adjacently so that the well-known diagram shown in Figure 1 is obtained. Curve I denotes the radiation diagram pertaining to the first beam, while curve II is the diagram corresponding to the second beam. Now, both of these beams or pencils are so positioned adjacent to each other (juxtaposed) that their diagrams come to intersect at the steepest points. The transmitters belonging to beams I and II transmit signals, which, for the same amplitude, result in a permanent dash or line, say, $a$ and $n$. Hence, a receiver equipment would receive a permanent dash at point P of Figure 1, whereas in point $P_1$ there would be recorded predominantly the signal corresponding to beam I, and at point $P_2$ the signal corresponding to beam II. This arrangement offers besides certain other drawbacks which consist in that the energies of the transmitters corresponding to the two beams must be absolutely alike in size and absolutely constant. However, these conditions are non-fulfillable in practice, and the result is that considerable errors in directive action of the beam are caused.

In order to insure as perfect as possible a symmetry, applicant proposes to utilize only one exciter in the focus of a concave mirror, and to cause the same to oscillate conjointly with the exciter about an angle $\alpha$, the plan being to cause the mirror or reflector to stay in the beam I for a relatively short while, and in the beam II for a relatively long time. If the receiver outfit comprises a sensitive needle instrument, then, with the use of a compensating arrangement, deflections or records, as shown in Figure 2, are obtained for points P, $P_1$ and $P_2$.

More in detail, the drawback residing in a differential method using two transmitters is that it is impossible to maintain both transmitters constant in relation to each other in such a way that equality of the diagram curves or graphs of Figure 1 will be secured. Upon one of these curves becoming distorted the point P as a consequence will be displaced towards the right or towards the left-hand side, depending on which one is distorted. This results in inaccuracies in the pointing characteristics of the receiver.

A further idea underlying this invention is to utilize just one transmitter so that by turning or by rocking (oscillating) the diagram I and the diagram II are alternately radiated off. This insures that the curves I and II are representative of currents of like amplitude and nature. This end may be attained by the use of an exciter generating ultra-short Hertzian waves and mounted in the focus of a Hertzian reflector so that a sharply defined beam is produced whose diagram corresponds to curve I or curve II in Figure 1. Means is provided whereby when the transmitter reflector is in a position so that its radiation diagram coincides with curve I it will stay in this position only a very brief time measured by the length of a dot and then turn about the angle $\alpha$ so that its radiation diagram comes to coincide with curve II in which positon it remains for a comparatively long while, that is, a time interval measured by a dash. During the change from curve I into curve II the exciter is automatically disconnected, whereupon the reflector oscillates back into its initial position, and during this motion of the system the exciter is again disconnected. One thus obtains the same picture or impression as above in a receiver outfit.

Figure 3 illustrates an embodiment of the idea by way of example. Referring to the drawing, S is the transmitter reflector, E the exciter which is rigidly united with the reflector to form an integral system. D is the source of current which is alternately connected by way of contacts $K_1$ and $K_2$ to the exciter while the system comprising the reflector and the exciter oscillates about the angle $\alpha$. While the reflector S may be oscillated in any manner, one means of oscillating the reflector S and exciter E has been given by way of example. A wheel F having cam surface 1 representative of the dashes and cam surfaces 2 representative of the dots may be driven at the proper rotation speed in any manner, as, for example, by the shaft of source D. A lever 3 fixed at 4 cooperates with a link 5 connected to a member 6 integral with reflector S to oscillate the reflector S and transmitter E through an arc. The lever 3 is biased for continued contact with F by a spring 8. The length of the lever system is such as to swing S through an angle α. The cam surfaces 1 and 2 may be in any sequence desired to send any code letter or signal. The raised portions and depressions are such that the lever 3 oscillates about its pivot 4 sufficiently to swing S and/or E through the desired arc and to maintain said elements at the ends of the arc the desired time interval.

In a modification of the invention the identical result is obtainable if exciter and reflector are not caused to oscillate simultaneously, but by that either the exciter is mounted stationary while only the reflector is caused to oscillate, or vice versa. Especially the latter arrangement may be of great advantage in actual practice, e. g., when it is necessary to provide very large reflectors where ultra-short Hertzian waves are dealt with. It is then unnecessary to set the reflector being of great weight into motion, indeed, only the exciter is oscillated, but the volume and weight of the latter may be kept inside reasonable limits.

Figure 4 is a diagrammatical view of an arrangement of this kind. S is the stationary reflector, E is the exciter adapted to oscillate around the focus and through the angle α. If E is in the position marked 1, it radiates off the diagram I; but when it is in the position 2, its radiation corresponds to diagram II. Hence, there is obtained the same diagrammatic picture as in Figure 1, and in accordance therewith the identical deflections will be indicated by the needle instrument as shown in Figure 2. $S_1$ denotes a small reflector which is intended to throw or focus the energy of the exciter as completely as possible upon the surface of the large mirror S and which most suitably oscillates conjointly with the exciter (for instance, spark-gap, tube, temperature radiator, etc.) about the focus. However, it is not necessary that the exciter, whether with or without reflector $S_1$, should oscillate around the focus under exactly symmetric conditions. On the contrary, the value α/2 may be located also outside the focal line, though for economical reasons, it would not be advisable usually to depart too much from the focus.

The transmitter at E in this modification may be energized in the same manner as the transmitter of Figure 3 while the transmitter E may be oscillated through the required arc by an arrangement as shown in Figure 3.

Disturbing or undesirable curves are obtained as the reflector, or, the exciter is oscillated, which must be compensated, and this is most conveniently accomplished by shuttering or screening. The compensation, neutralizing or screening means can be made particularly simple in the present case. As shown in Figure 5, a very small stationary screening mirror Z is disposed between the reflector wall S and the exciter system E, $S_1$, said mirror Z serving to partially screen off the rays in the median position. But if the exciter system is in positions 1 or 2 the rays will no longer be acted upon by Z. When using an exciter for ultra-short waves, recourse may be had to a metallic rod of around λ/2 length. By adjusting the distance Z—E the conditions of compensation can be very nicely adjusted.

Having thus described my invention and the operation thereof, what I claim is:

1. A beam transmitter adapted to mark out a course by emitting characteristic signals along each outer boundary of said course comprising, an oscillation generating system, a directive radiating system connected therewith, means to oscillate one of said systems through a predetermined arc, means for maintaining said oscillated system stationary at each end of said arc for predetermined time periods, and means for rendering one of said systems operative during the time said oscillated system is maintained stationary at each end of the arc of oscillation.

2. An arrangement as recited in claim 1 including means for rendering one of said systems inoperative during the movement of the oscillated system between the ends of said arc of oscillation.

3. An arrangement as recited in claim 1 including means for maintaining said oscillated system stationary at each end of the arc through which it is oscillated different predetermined time intervals.

4. A course indicating device comprising a high frequency generator, a reflector, means to oscillate said reflector and said generator through a predetermined arc, means for maintaining said generator and said reflector stationary at each end of their arc of oscillation, and means for rendering said generator operative during the time it is stationary.

WERNER LUDENIA.